United States Patent
Degruson et al.

(10) Patent No.: US 9,647,276 B2
(45) Date of Patent: May 9, 2017

(54) ACTIVATION MECHANISM FOR A RESERVE BATTERY CELL

(71) Applicant: EAGLEPICHER TECHNOLOGIES, LLC, Joplin, MO (US)

(72) Inventors: James Anthony Degruson, Carl Junction, MO (US); David Andrew Timothy Darch, Webb City, MO (US); Michael Parrot, Joplin, MO (US); Greg Miller, Diamond, MO (US); Michael Scott Reeves, Neosho, MO (US); William G. Studyvin, Cherokee, KS (US)

(73) Assignee: EaglePicher Technologies, LLC, Joplin, MO (US)

( * ) Notice: Subject to any disclaimer, the term of this patent is extended or adjusted under 35 U.S.C. 154(b) by 688 days.

(21) Appl. No.: 14/033,838

(22) Filed: Sep. 23, 2013

(65) Prior Publication Data

US 2014/0023904 A1    Jan. 23, 2014

Related U.S. Application Data

(62) Division of application No. 12/762,014, filed on Apr. 16, 2010, now Pat. No. 8,603,658.

(51) Int. Cl.
*H01M 6/32* (2006.01)

(52) U.S. Cl.
CPC ......... *H01M 6/32* (2013.01); *Y10T 29/49108* (2015.01); *Y10T 29/49863* (2015.01)

(58) Field of Classification Search
CPC ........................................... H01M 6/30–6/385
See application file for complete search history.

(56) References Cited

U.S. PATENT DOCUMENTS

| | | | |
|---|---|---|---|
| 3,425,351 A | 2/1969 | Fyfe | |
| 3,516,869 A | 6/1970 | Broglio | |
| 3,629,009 A | 12/1971 | Bennett | |
| 3,653,973 A | 4/1972 | Broglid | |
| 3,669,753 A | 6/1972 | Kaye | |
| 3,736,188 A | 5/1973 | Kaye | |
| 3,846,177 A * | 11/1974 | Mauch et al. | H01M 6/38 429/113 |
| 3,869,315 A | 3/1975 | Dolgner | |
| 3,930,885 A | 1/1976 | Dey | |
| 4,375,504 A | 3/1983 | Jensen et al. | |
| 4,449,455 A | 5/1984 | Halssig | |
| 4,487,127 A | 12/1984 | Lüebbers | |
| 4,612,264 A | 9/1986 | Fairwood et al. | |

(Continued)

FOREIGN PATENT DOCUMENTS

GB    2 059 672 A    4/1981

OTHER PUBLICATIONS

Sep. 9, 2011 Extended European Search Report issued in European Application No. 11162750.1.

*Primary Examiner* — Barbara Gilliam
*Assistant Examiner* — Robert S Carrico
(74) *Attorney, Agent, or Firm* — LSIP Law LLC

(57) ABSTRACT

A biasing mechanism for pressurizing an electrolytic solution of a reserve battery cell, the biasing mechanism containing a compressed spring and a trigger operatively associated with the compressed spring. The trigger is configured to release the compressed spring to pressurize the electrolytic solution.

6 Claims, 21 Drawing Sheets

(56) References Cited

U.S. PATENT DOCUMENTS

| | | |
|---|---|---|
| 4,642,275 A | 2/1987 | Smith et al. |
| 5,018,770 A * | 5/1991 | Beasley ................ A62C 35/68 137/68.3 |
| 5,108,854 A | 4/1992 | Kelly |
| 5,872,324 A | 2/1999 | Watson, Jr. et al. |
| 6,187,471 B1 | 2/2001 | McDermott et al. |
| 6,673,486 B2 | 1/2004 | Rüdenauer et al. |
| 6,844,108 B1 | 1/2005 | Lee et al. |
| 7,055,570 B2 | 6/2006 | Hong |
| 7,504,177 B2 | 3/2009 | Peabody |
| 2006/0040174 A1 | 2/2006 | Peabody |

* cited by examiner

ACTIVATION MECHANISM FOR A RESERVE BATTERY CELL

CROSS-REFERENCE TO PRIOR APPLICATION

This is a divisional of application Ser. No. 12/762,014 filed Apr. 16, 2010. The entire disclosure of the prior application is hereby incorporated by reference herein in its entirety.

BACKGROUND

The field of this invention relates generally to reserve battery cells and, more particularly, to an activation mechanism for a reserve battery cell.

Reserve battery cells are battery cells that can be maintained in an inactive state (i.e., a state in which power is neither generated nor stored) until power is needed for supplying to a load (e.g., a pump, a light bulb, or a computer). By maintaining reserve battery cells in the inactive state, the power generation and storage capacity characteristics of the battery cells are maximized. As a result, reserve battery cells have a substantially longer shelf life as compared to activated battery cells (i.e., a battery cell that is generating and/or storing power).

Reserve battery cells can generate and store power in a variety of different ways. For example, one particular reserve battery cell is an electrochemical, reserve battery cell in which an electrolytic solution is isolated from dry electrodes in the inactive state to facilitate preventing a power-generating chemical reaction between the electrolytic solution and the electrodes. To activate the electrochemical battery cell, the electrolytic solution is brought into contact with the electrodes thereby initiating the chemical reaction that generates power. At least some electrochemical, reserve battery cells utilize a partition or barrier that separates the electrolytic solution from the electrodes. When needed, a force can be applied to the partition to rupture or otherwise puncture the partition. In one known configuration, the external setback force that results from launching a projectile (e.g., an artillery shell) can be used to rupture the partition.

Reserve battery cells can power a variety of different devices in a variety of different environments, and an external force having a magnitude that is sufficient to be the sole activation force (i.e., sufficient to rupture the barrier between the electrolytic solution and the dry electrodes) may not be readily available when power output is desired. There is a need, therefore, for an activation mechanism that is operable when an external force is available but has a magnitude that is less than sufficient to be the sole activation force.

SUMMARY

In one aspect, an activation mechanism for a reserve battery cell generally includes a housing with a chamber containing an electrolytic solution and a delivery device configured to discharge the electrolytic solution from the housing. The delivery device comprises a compressed spring configured to be released in response to an external force to initiate the discharge of the electrolytic solution from the housing.

In another aspect, a biasing mechanism for pressurizing an electrolytic solution of a reserve battery cell generally includes a compressed spring and a trigger operatively associated with the compressed spring. The trigger is configured to release the compressed spring to pressurize the electrolytic solution.

In yet another aspect, a method of assembling a biasing mechanism for releasing an electrolytic solution within a reserve battery cell generally includes compressing a spring and operatively associating a trigger with the compressed spring. The trigger is configured to release the compressed spring such that the compressed spring decompresses to pressurize the electrolytic solution.

BRIEF DESCRIPTION OF THE DRAWINGS

Corresponding reference characters indicate corresponding parts throughout the several views of the drawings.

DETAILED DESCRIPTION OF THE DRAWINGS

Figure 1:
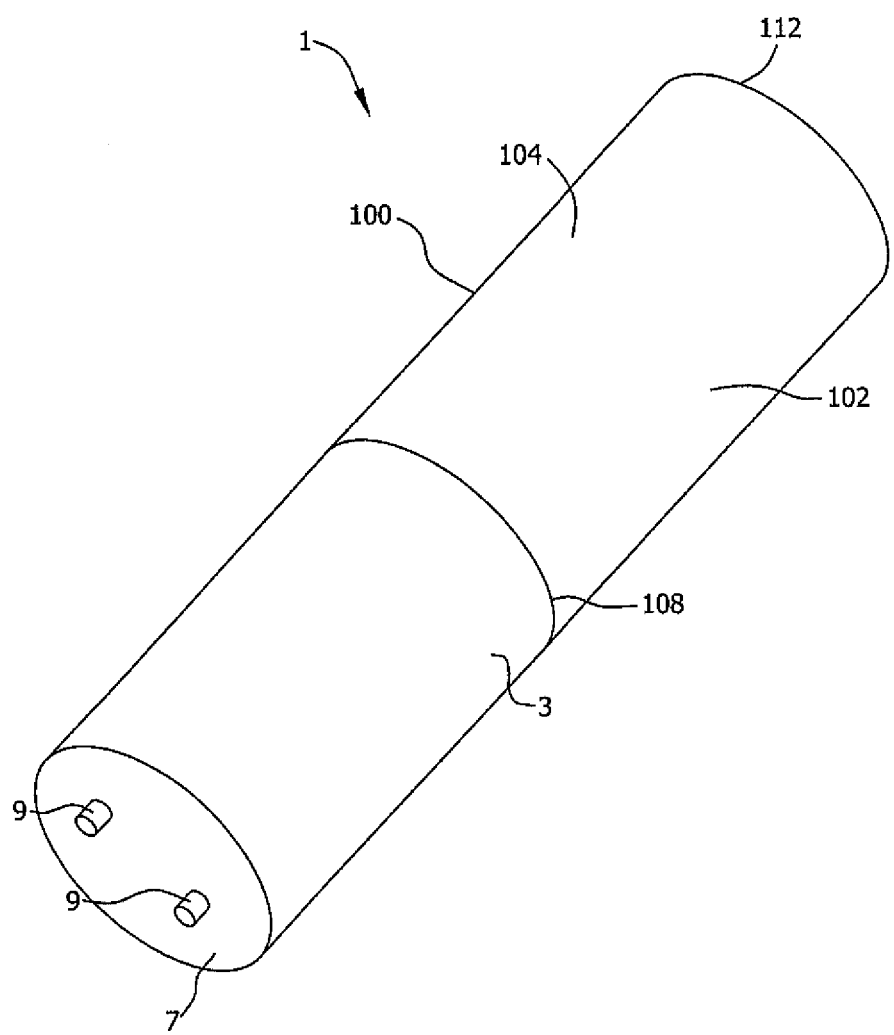
FIG. 1 is a perspective view of a reserve battery cell having one embodiment of an activation mechanism, the reserve battery cell being in an inactive state.
Figure 2:
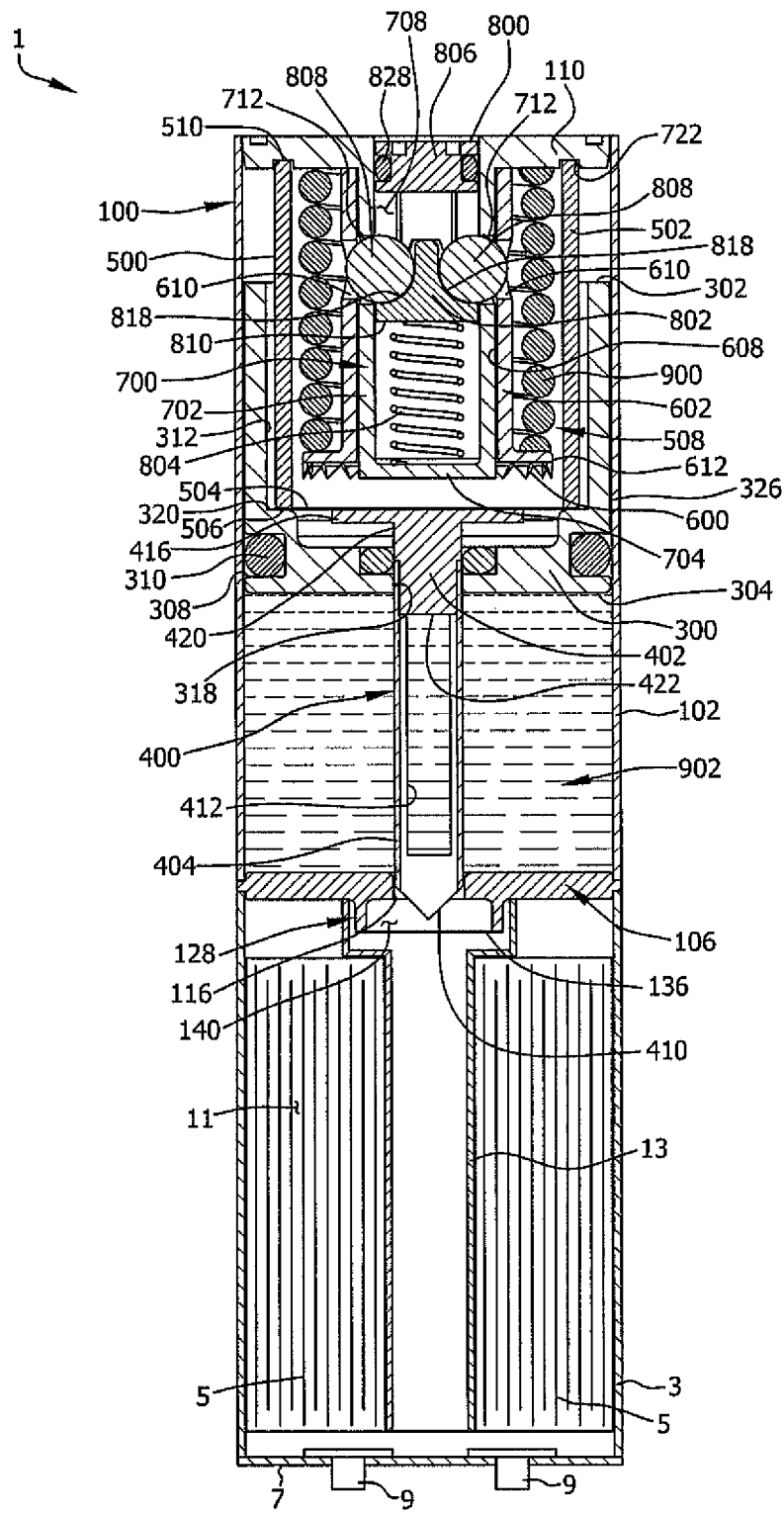
FIG. 2 is a longitudinal cross-section of the reserve battery cell of FIG. 1.

Referring now to the drawings and, in particular, to FIGS. 1 and 2, a reserve battery cell for providing electrical energy to a load after activation is indicated generally at 1. In the illustrated embodiment, the reserve battery cell 1 includes a generally cylindrical case 3 defining an electrode chamber 11 for housing (i.e., in a vacuum) positive and negative electrodes 5 and an activation mechanism, indicated generally at 100, for transforming the reserve battery cell 1 from an inactive state to an active state as described in more detail below. The case 3 comprises a hollow mandrel 13 configured to permit an electrolytic solution discharged into the mandrel 13 to contact the electrodes 5, and the case 3 also comprises a disk-shaped end wall 7 closing one of its ends. The other, opposite end of the case 3 is closed by the activation mechanism 100. A pair of electrode connectors 9 for operatively connecting the reserve battery cell 1 to a load (not shown) extends outward from the end wall 7 of the case 3. It is understood, however, that the case 3 can have other suitable shapes (e.g., block).

Figure 3:
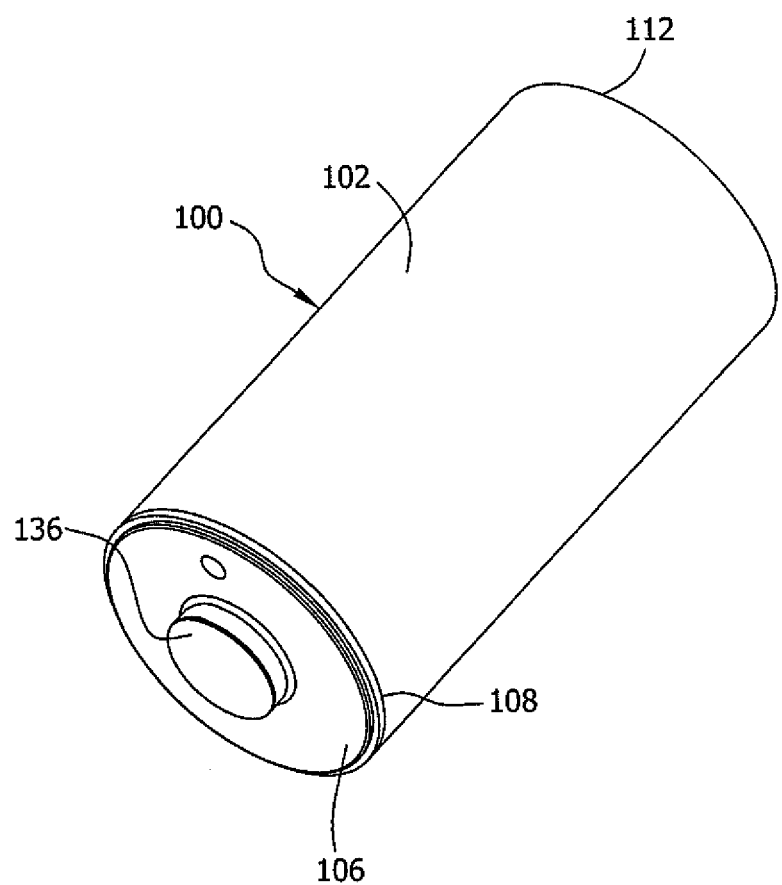
FIG. 3 is a perspective view of the activation mechanism of the reserve battery cell.

With reference now to FIG. 3, the activation mechanism 100 comprises a cylindrical housing 102 having a first end 108 and a second end 112. A first end cap 106 closes the first end 108 of the housing 102 and a second end cap 110 (FIGS. 2, 11, 14, 15, 20, and 21) closes the second end 112 of the housing 102. It is understood, however, that the activation mechanism 100 may have any suitable shape(s) without departing from the scope of this invention. Additionally, the components of the activation mechanism 100 may be fabricated from any suitable material, such as a material that is resistant to a corrosive effect of an electrolytic solution (e.g., a stainless steel material).

Figure 4:
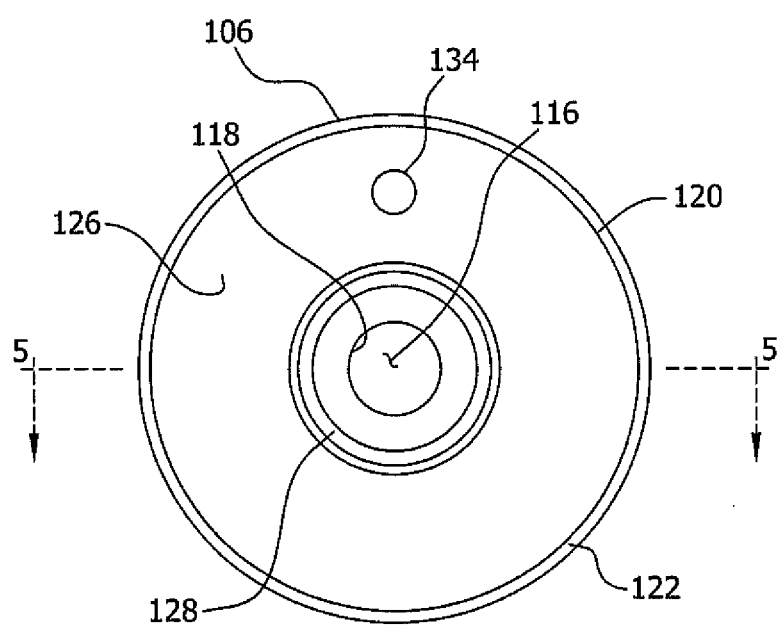
FIG. 4 is a top view of a first end cap of the activation mechanism of FIG. 1.
Figure 5:
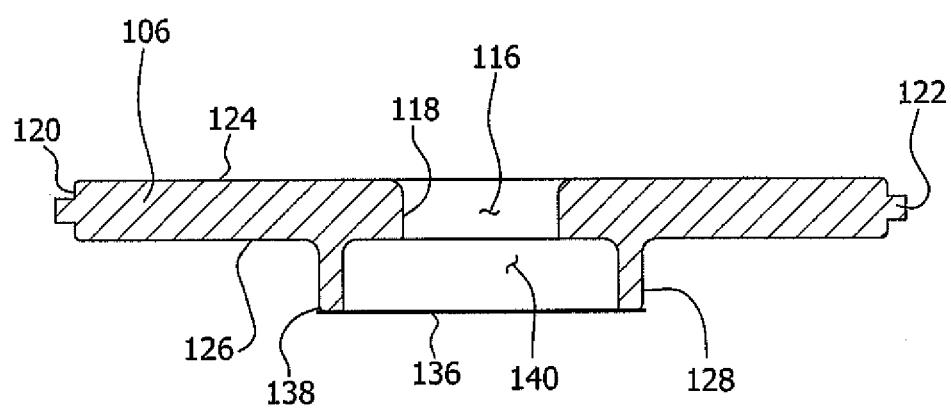
FIG. 5 is a cross-section of the first end cap of FIG. 4 taken along line 5-5.

FIG. 4 is a top view of the first end cap 106 and FIG. 5 is a section of the first end cap of FIG. 4 taken along line 5-5. The first end cap 106, which is generally disk-shaped, has central bore 116, an inner annular wall 118, and an outer annular wall 120. The outer annular wall 120 includes an outward extending annular rim 122 that facilitates securing the first end cap 106 to the housing 102. Additionally, the first end cap 106 has an interior surface 124, an exterior surface 126, and a fitting 128 that extends outwardly from the exterior surface 126. As seen in FIGS. 4 and 5, the fitting 128 is axially aligned with the central bore 116.

As best seen in FIG. 5, a first barrier 136 closes the fitting 128 to define a pocket 140 between the first barrier 136, the fitting 128, and a portion of the exterior surface 126 of the first end cap. The first barrier 136 can be secured to the fitting 128 via a suitable bonding agent such as an adhesive or a weld. It is contemplated that the first end cap 106 may not include the fitting 128. Rather, the first barrier 136 can be connected directly to the exterior surface 126 of the first end cap 106. The first barrier 136 may be made from any suitable material that can be punctured, is neutral to an electrolytic solution, and can maintain about a 20-year permittivity (e.g., a metallic foil).

With reference again to FIG. 4, the first end cap 106 includes a relatively small, circular port 134 located approximately halfway between the fitting 128 and the outer wall 120. It is understood, however, that the port 134 can have a different size, shape and/or location than that illustrated herein. In some embodiments, the first end cap 106 may not include the port 134. Instead, the port 134 can be located on the housing 102 rather than on the first end cap 106.

Figure 6:
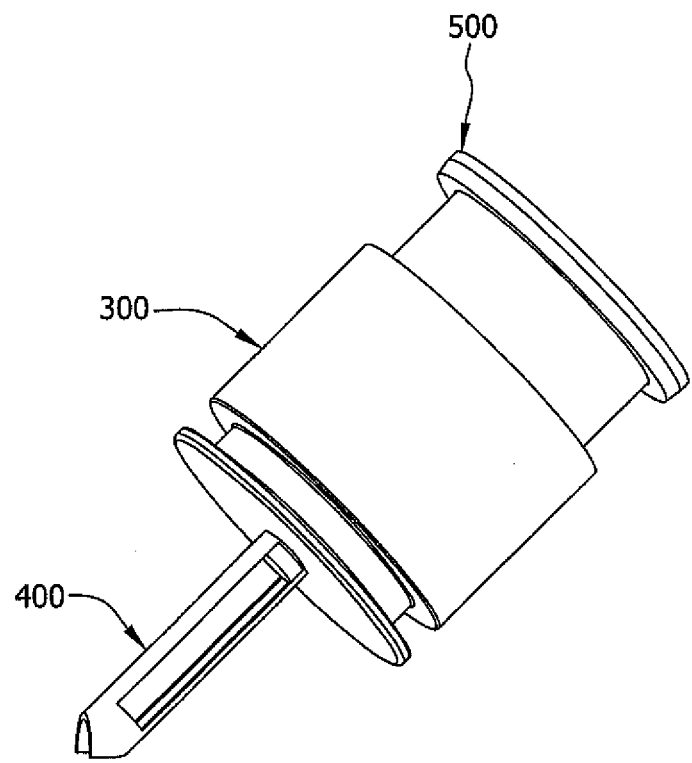
FIG. 6 is a perspective view of a delivery device of the activation mechanism.
Figure 7:
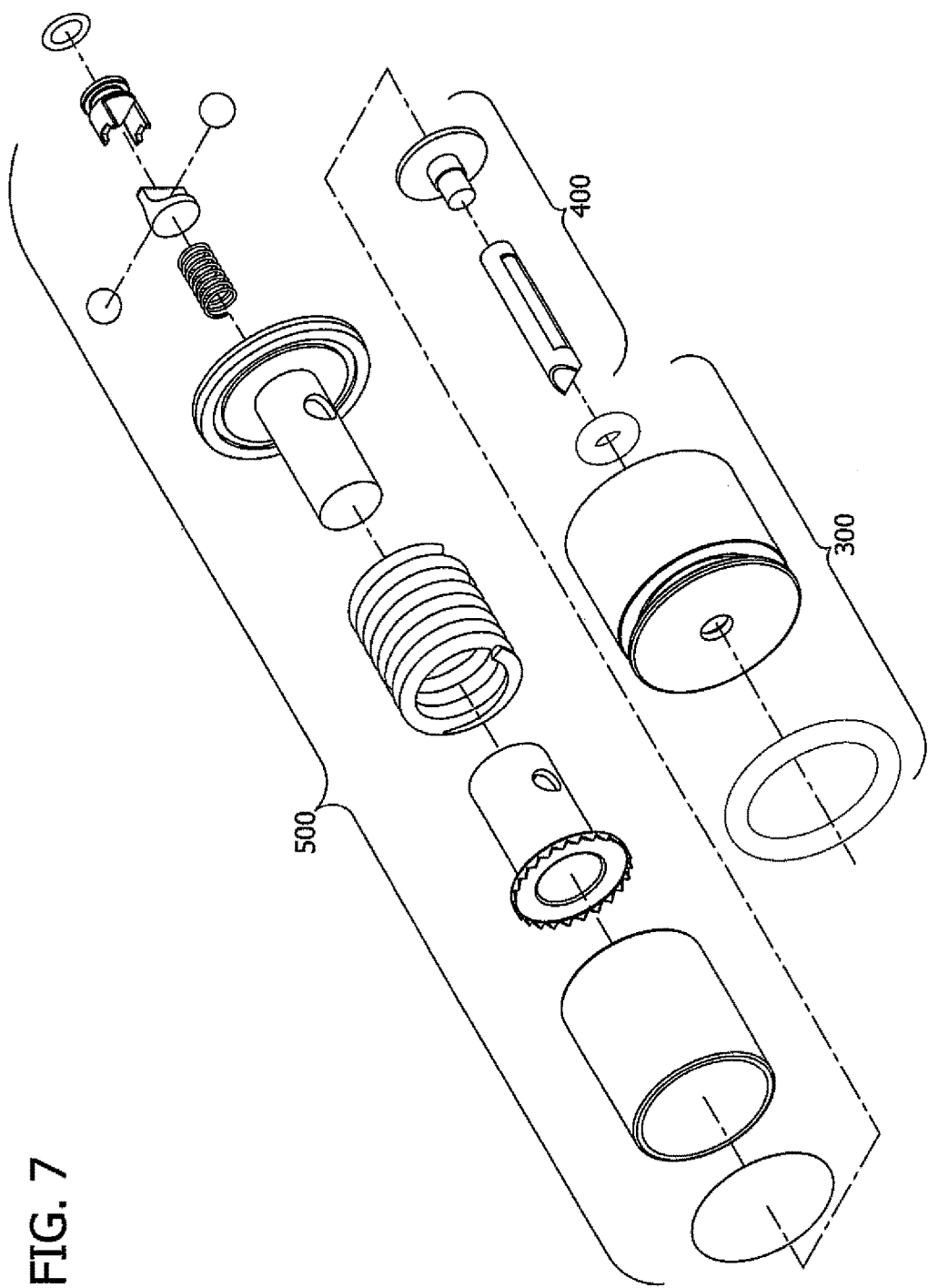
FIG. 7 is an exploded view of the delivery device.

FIGS. 6 and 7 are perspective and exploded views, respectively, of the activation mechanism 100 with the housing 102 and the first end cap 106 removed. As seen in FIGS. 6 and 7, the illustrated activation mechanism 100 comprises a piston 300, an injector 400 that extends through the piston 300, and a biasing mechanism 500 that is partially seated within the piston 300. The piston, injector, and biasing mechanism are indicated generally by their respective reference numbers.

Figure 8:
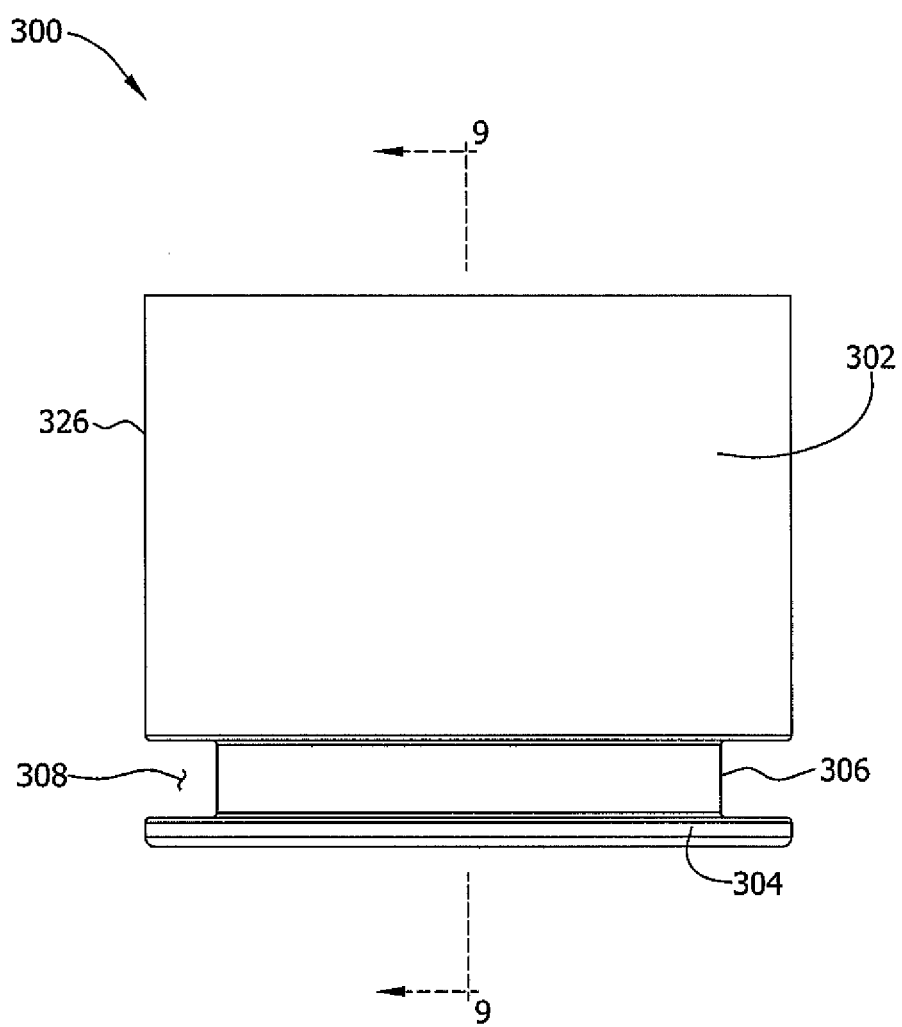
FIG. 8 is a side view of a piston of the delivery device.
Figure 9:
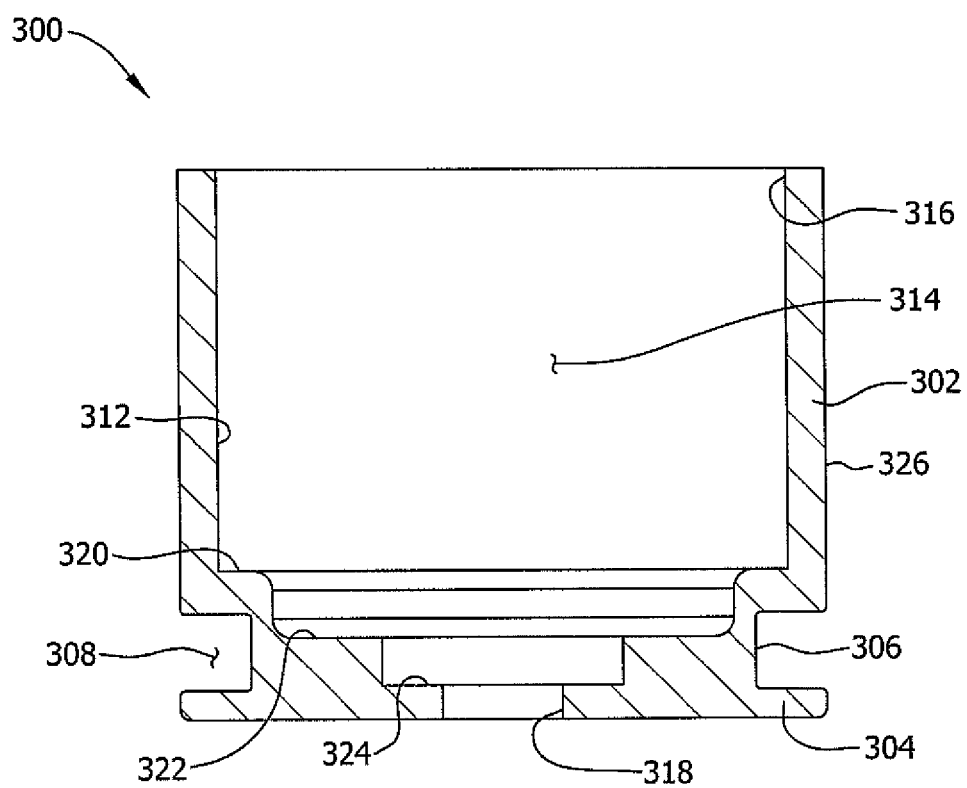
FIG. 9 is a cross-section of the piston of FIG. 8 taken along line 9-9.

FIG. 8 is a side view of the piston 300, and FIG. 9 is a section of the piston 300 taken along line 9-9 of FIG. 8. The piston 300 comprises a generally cylindrical body 302, a generally disk-shaped head 304 spaced from the body 302, and a neck 306 that extends between the body 302 and the head 304. As seen in FIG. 8, the body 302, head 304, and neck 306 cooperatively define an annular groove 308 for receiving a suitable gasket 310. A gasket (e.g., an o-ring) is shown being received in the annular groove 308 in FIGS. 2, 20 and 21. The head 304, as seen in FIG. 9, includes a central circular bore 318.

With reference to FIG. 9, the body 302 has an open end 316, an outer surface 326, and an inner surface 312 that partially defines an interior chamber 314 of the piston 300. The neck 306 and head 304 also partially define the interior chamber 314. As see in FIG. 9, the body 302 has a first, interior annular shoulder 320, the neck 306 has a second, interior annular shoulder 322, and the head 304 has a third, interior annular shoulder 324. As a result, the piston 300 is stepped three times from the inner surface 312 of the body 302 to the bore 318 in the head 304.

Figure 10:
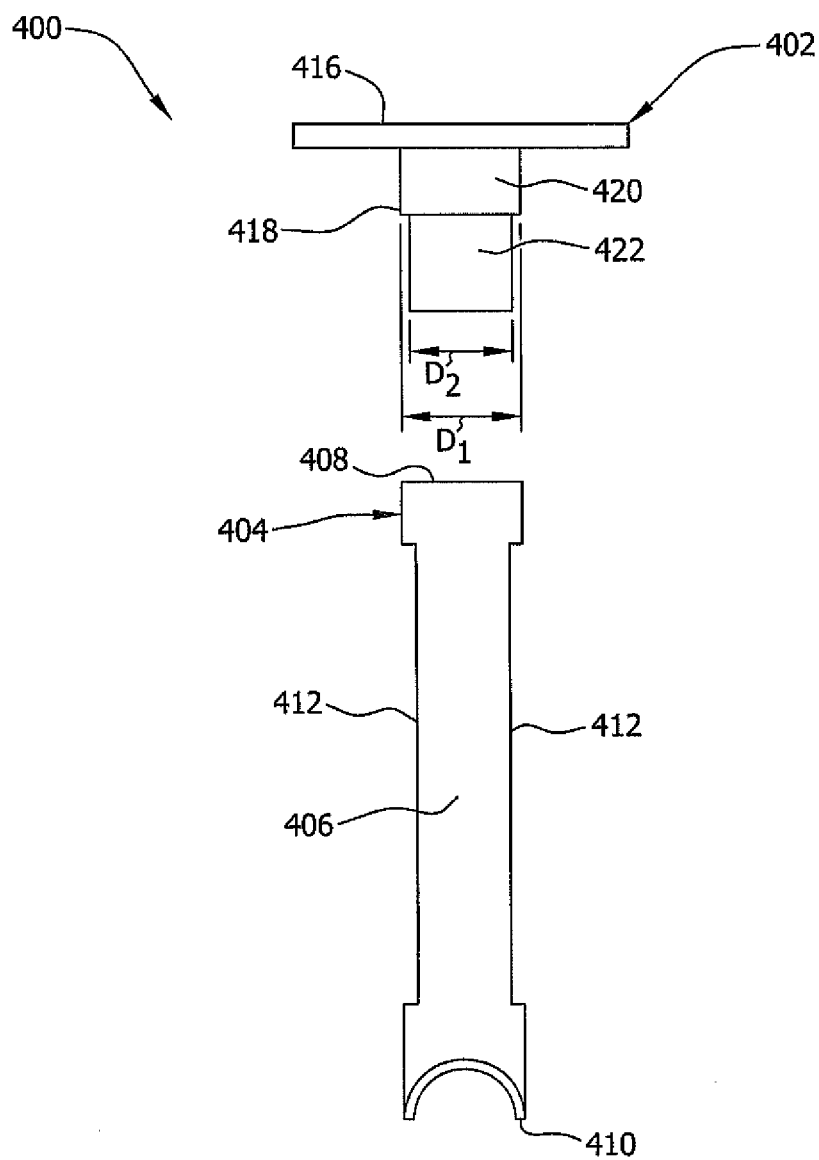
FIG. 10 is an exploded view of an injector of the delivery device.

As seen in FIG. 10, the injector 400 includes a base, indicated generally at 402, and a needle, indicated generally at 404, extending from the base 402. The needle 404, which is hollow, has a generally cylindrical body 406 with an open proximal end 408 and an open distal end 410. The distal end 410 has a contour that facilitates piercing the first barrier 136 (e.g., a contour that is sharpened or pointed). The body 406 includes two generally rectangular cutouts 412. In the illustrated embodiment, the cutouts 412 are disposed along the length of body 406 and aligned generally opposite from one another. It is understood, however, that the cutouts 412 can have different shapes and sizes. It is also understood that the body 406 can have more or fewer cutouts 412 than those illustrated and described herein.

The base 402 of the injector 400 includes a generally circular plate 416 and a generally cylindrical stem 418 extending outward from the plate 416. The stem 418 has a first tier 420 with a first diameter $D_1$ and a second tier 422 with a second diameter $D_2$ that is less than the first diameter $D_1$ of the first tier 420 such that the second tier 422 is sized for insertion into the proximal end 408 of the needle 404. The body 406 of the injector 400 abuts against the first tier 420 of the stem 418 when the second tier 422 is inserted into the needle 404 (FIG. 2).

Figure 11:
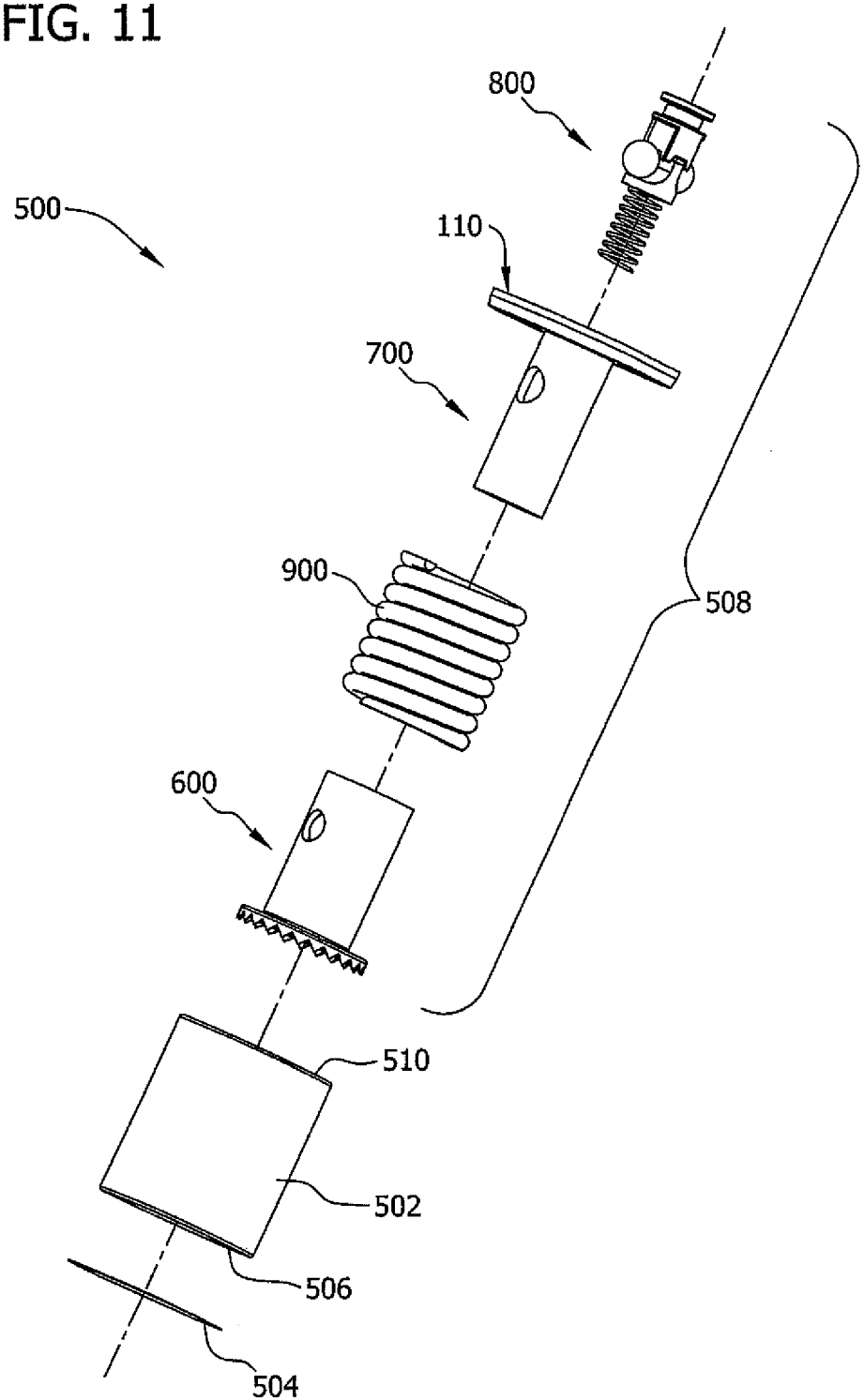
FIG. 11 is an exploded view of a biasing mechanism of the delivery device.

FIG. 11 is an exploded view of the biasing mechanism 500. The biasing mechanism 500 includes a tubular casing 502 having a first end 506 and a second end 510, a second barrier 504 suitably secured to the first end 506 of the casing 502 (e.g., via a suitable bonding agent such as an adhesive or a weld), and a driver 508 inserted into the casing 502. The driver 508 is suitably attached to (e.g., integrally formed with or formed separately from and welded to) the second end cap 110. The second barrier 504 may be made from any suitable material that can be punctured, is neutral to an electrolytic solution, and can maintain about a 20-year permittivity (e.g., a metallic foil). The driver 508 comprises a ram 600, a trigger sleeve 700 sized for insertion into the ram 600, a trigger 800 sized for insertion into the trigger sleeve 700, and a first spring 900 sized for disposition about the ram 600.

Figure 12:
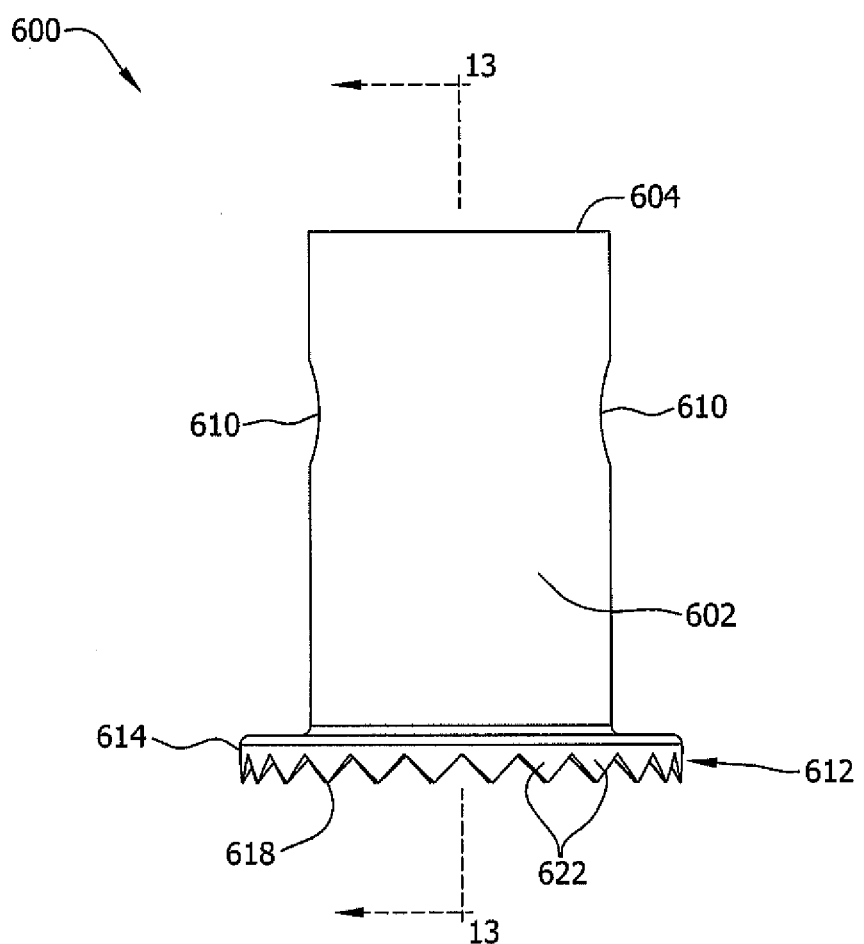
FIG. 12 is a side view of a ram of the biasing mechanism.
Figure 13:
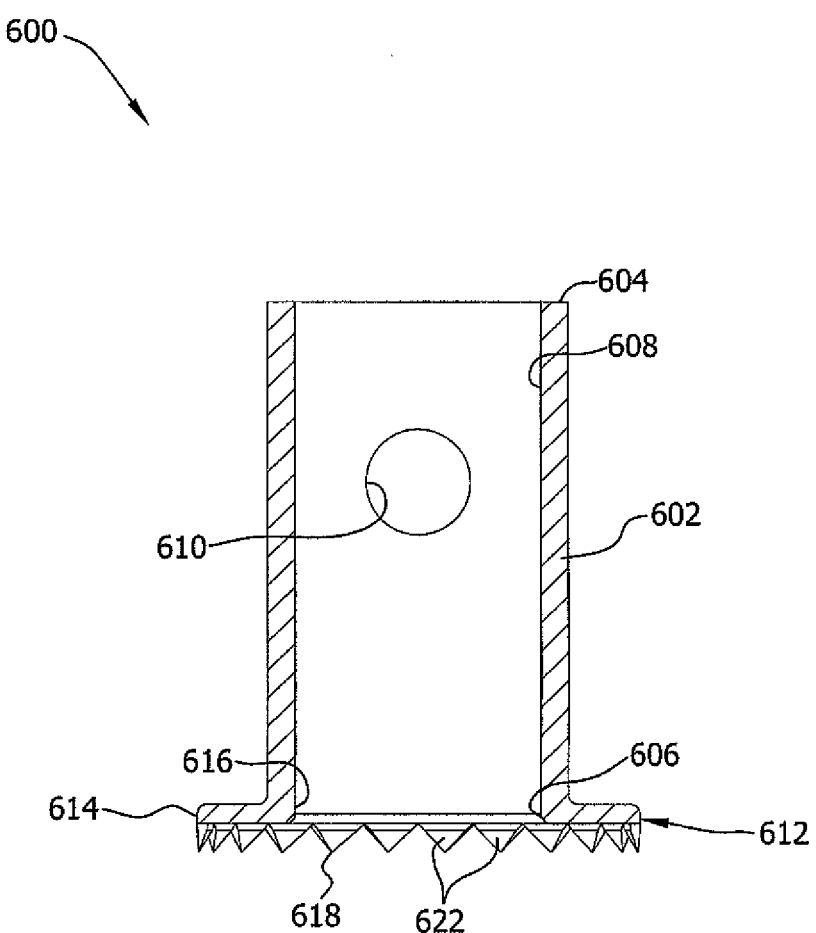
FIG. 13 is a cross-section of the ram of FIG. 12 taken along line 13-13.

With respect to FIGS. 12 and 13, the ram 600 includes a generally cylindrical body 602 having a first open end 604, a second open end 606, and an inner surface 608. The body 602 also includes two circular apertures 610 that are substantially aligned with one another on opposite sides of the body 602. The ram 600 further includes an impact disk, indicated generally at 612, formed integrally with and extending concentrically outwardly from the second open end 606 of the body 602. The impact disk 612 has an outer side surface 614, an inner side surface 616, and a contact surface 618 configured to puncture the second barrier 504.

The illustrated contact surface 618 includes a plurality of tooth-like serrations 622, but it is understood that the contact surface 618 can be formed having one or more other structures suitable for puncturing the second barrier 504.

Figure 14:
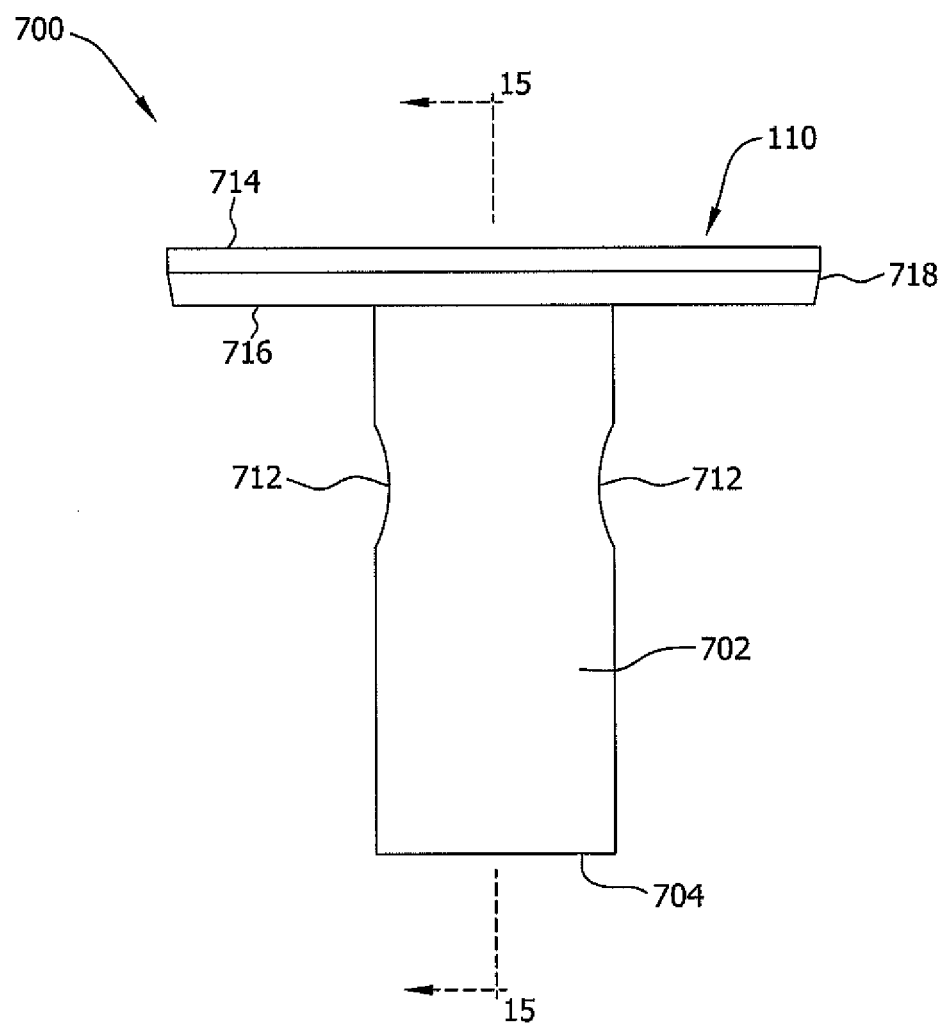
FIG. 14 is a side view of a trigger sleeve of the biasing mechanism connected to a second end cap of the housing.
Figure 15:
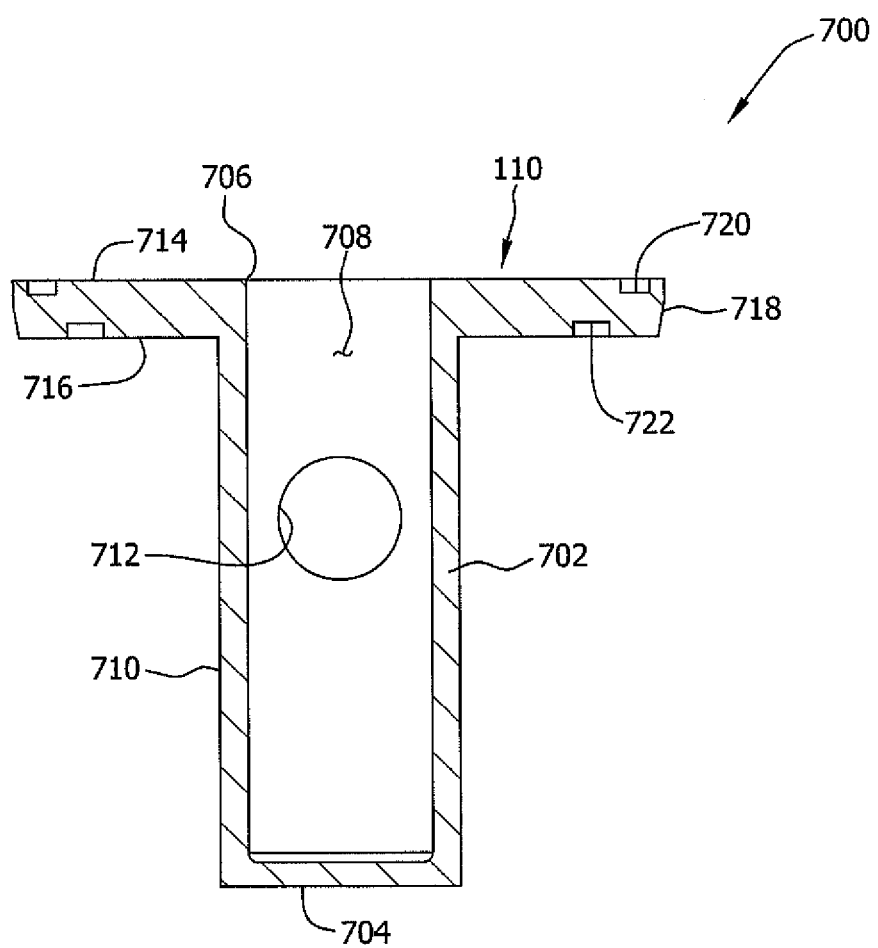
FIG. 15 is a cross-section of the trigger sleeve and the second end cap of FIG. 14 taken along line 15-15.

With respect to FIGS. 14 and 15, the trigger sleeve 700 includes a generally cylindrical sidewall 702 that extends from a closed end 704 to an open end 706 and defines a cavity 708. The sidewall 702 has a diameter that is sized to fit within the ram 600. The sidewall 702 has two, opposing apertures 712 as illustrated in FIG. 14. The second end cap 110 of the activation mechanism 100 extends outwardly from the sidewall 702. The second end cap 110 has an outer surface 714, an inner surface 716, and a peripheral face 718 extending between the inner surface 716 and the outer surface 714. An outer groove 720 is formed in the outer surface 714, and an inner groove 722 is formed in the inner surface 716. The outer groove 720 is closer to the peripheral face 718 than the inner groove 722. As seen in FIGS. 14 and 15, the peripheral face 718 tapers slightly inward as it approaches the inner surface 716.

Figure 16:
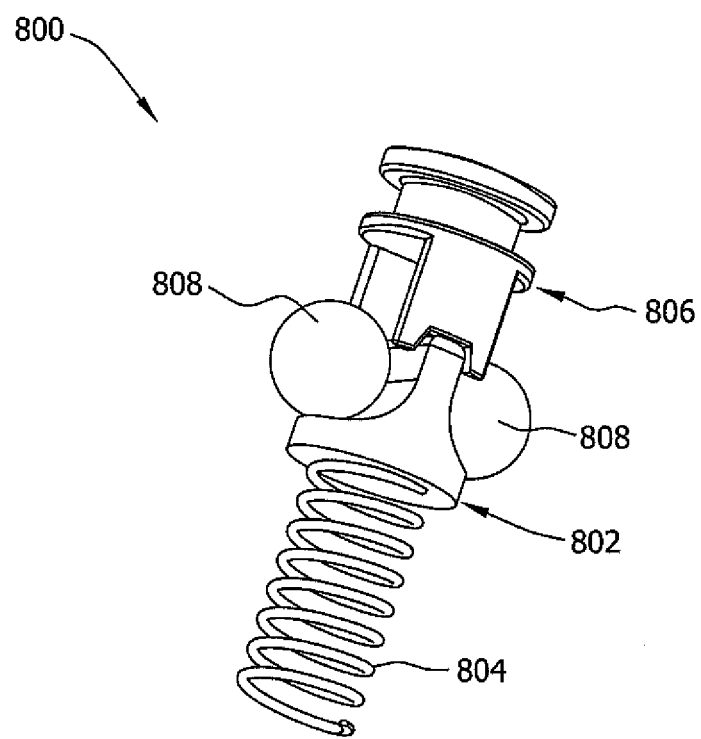
FIG. 16 is a perspective view of a trigger of the biasing mechanism.
Figure 17:
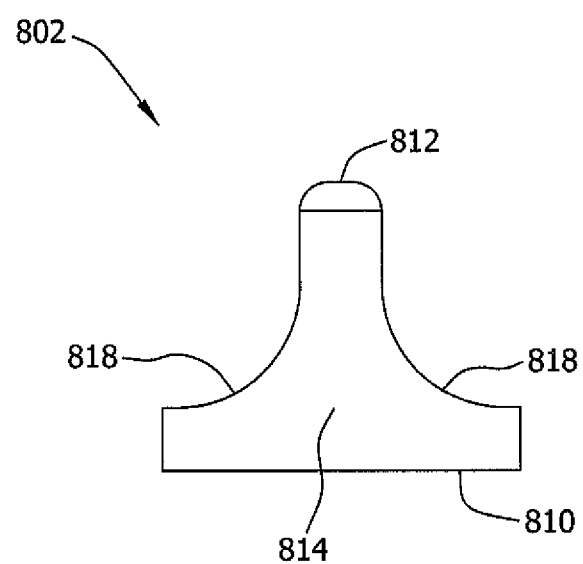
FIG. 17 is a side view of a spacer of the trigger.

FIG. 16 is a perspective view of the trigger 800. As illustrated therein, the trigger 800 includes a spacer, indicated generally at 802, a second spring 804, a plug, indicated generally at 806, configured to engage the spacer 802, and a pair of balls 808 sized to be seated against the spacer 802. With reference to FIG. 17, the spacer 802 has a base surface 810, a top surface 812, and a side surface 814. The side surface 814 has a pair of opposing sloped (e.g., arcuate) portions 818. The sloped portions 818 are contoured such that each of the balls 808 can be seated against and roll along a corresponding one of the sloped portions 818.

Figure 18:
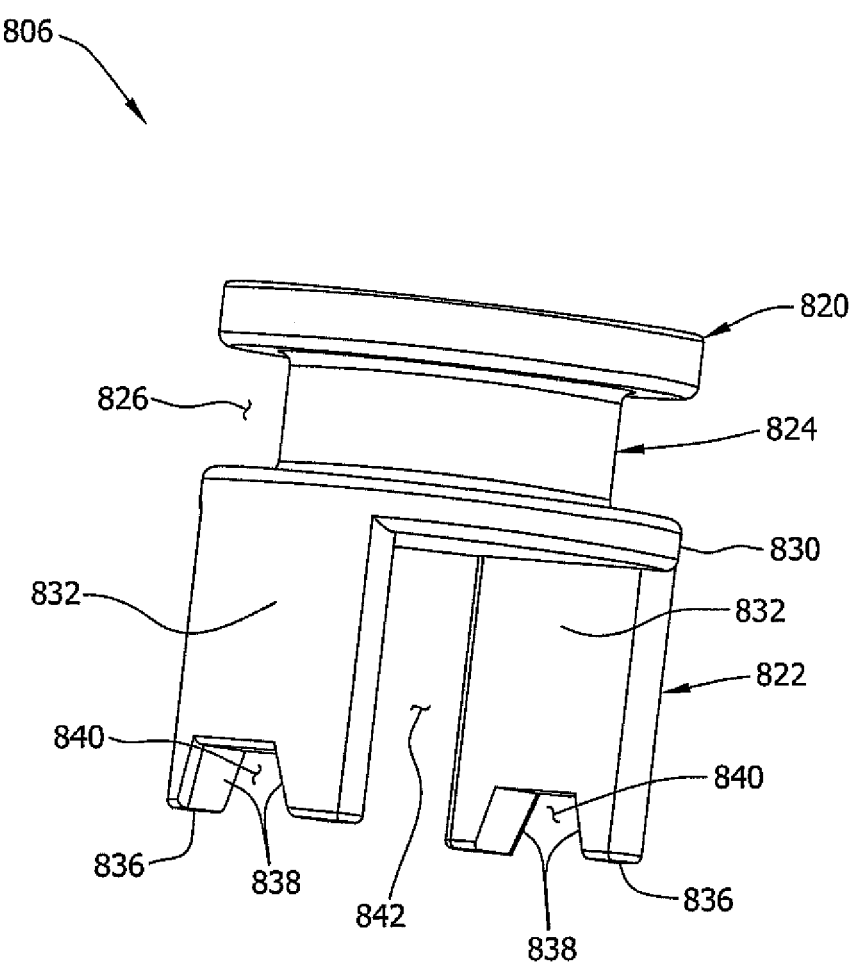
FIG. 18 is a perspective view of a plug of the trigger.
Figure 19:
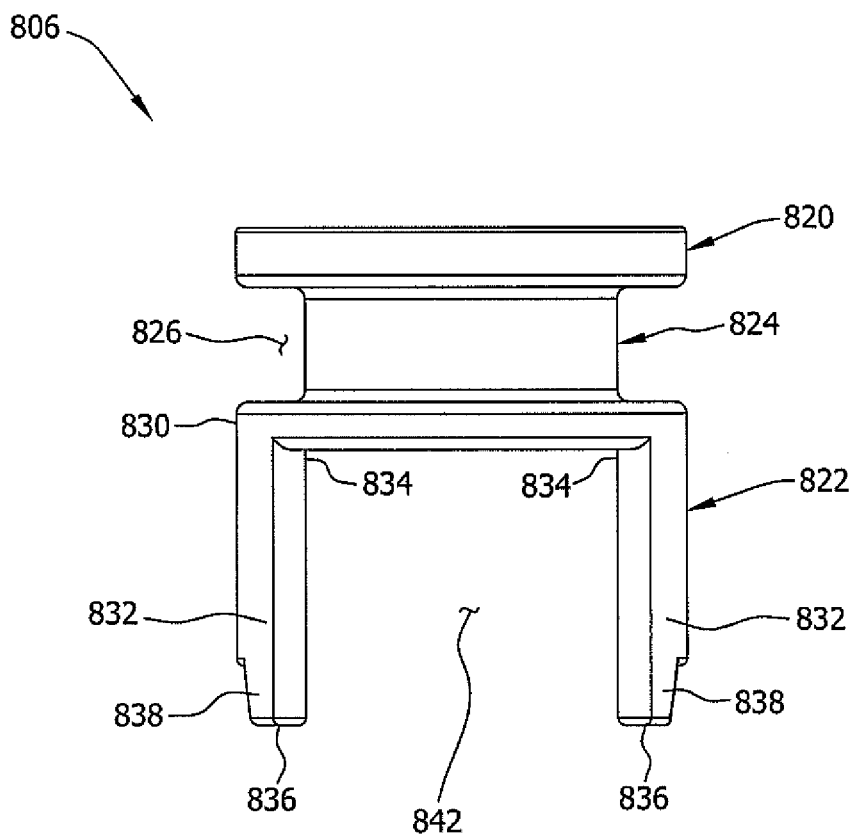
FIG. 19 is a side view of the plug.
Figure 20:
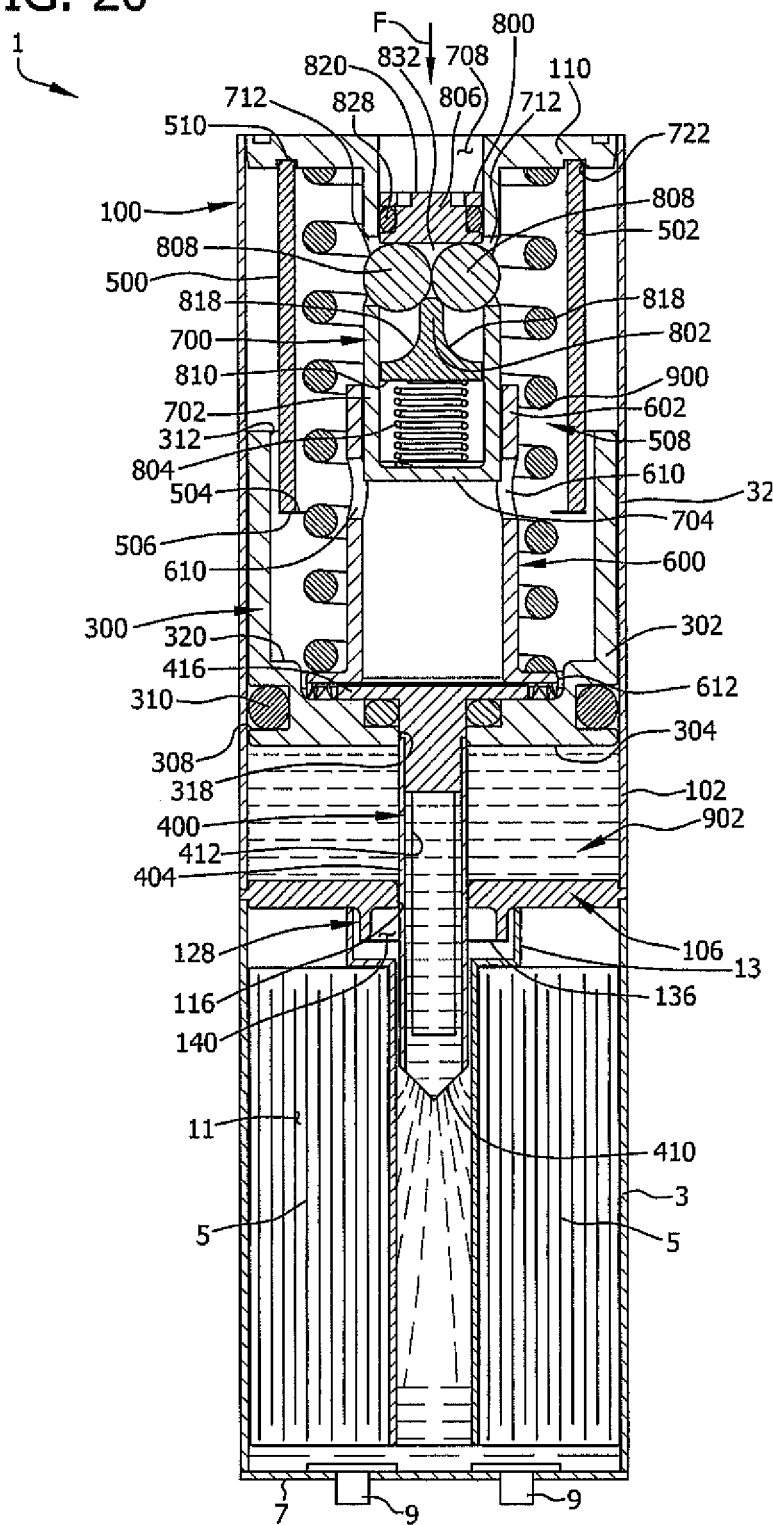
FIG. 20 is a longitudinal cross-section similar to FIG. 2 but showing the activation mechanism in the process of being actuated to move the reserve battery cell from the inactive state to an active state.
Figure 21:
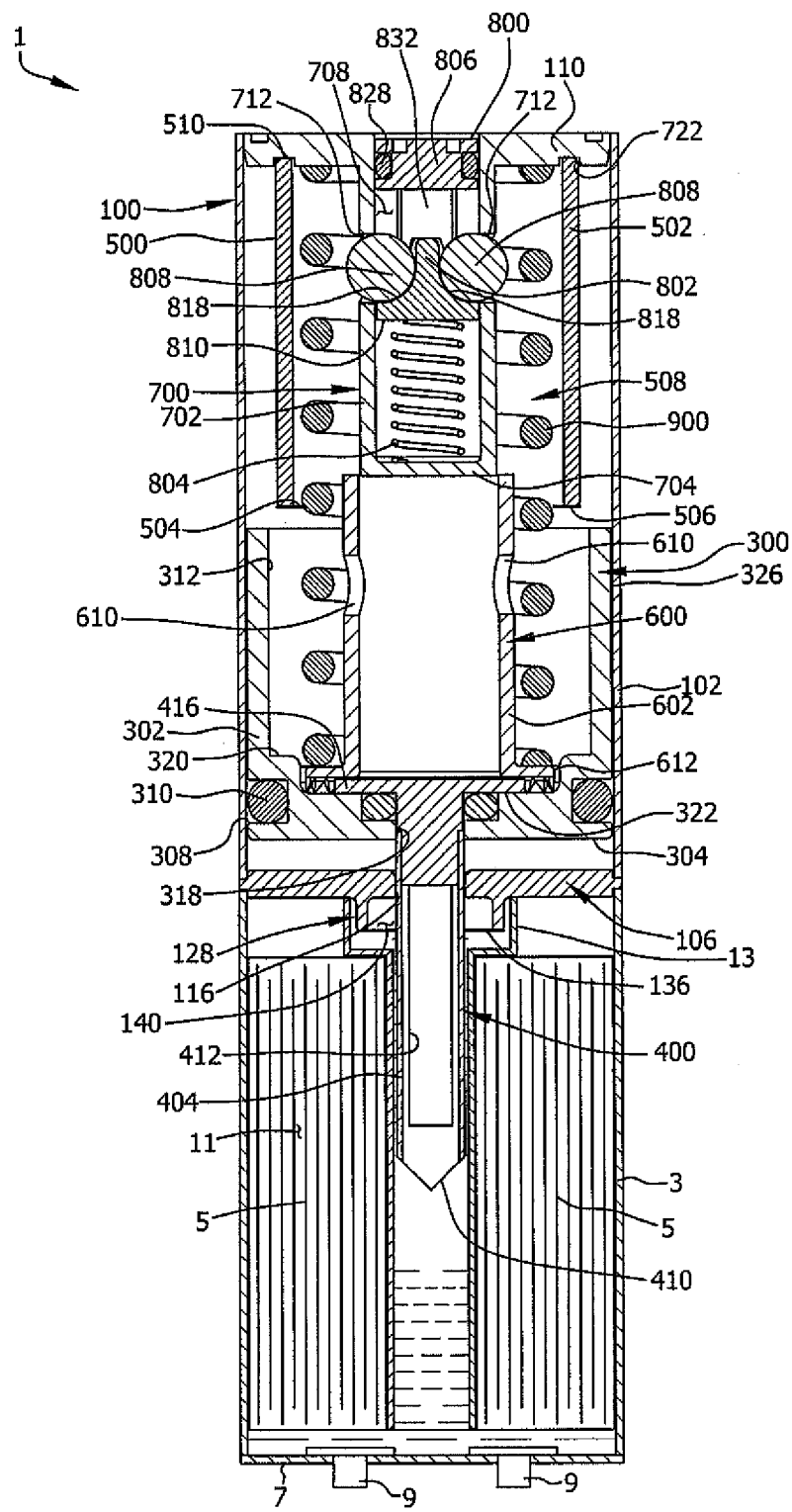
FIG. 21 is a longitudinal cross-section similar to FIGS. 2 and 20 but showing the activation mechanism fully actuated and the reserve battery cell in the active state.

With reference to FIGS. 18 and 19, the plug 806 includes a head 820, a body 822, and a neck 824 that extends between the head 820 and the body 822 to define a peripheral groove 826 that is sized to receive a gasket 828 (e.g., an o-ring as illustrated in FIGS. 2, 20 and 21). The head 820, body 822, and neck 824 are indicated generally by their respective reference numbers. The body 822 comprises a base 830 and a pair of opposing arms 832 extending outward from the base 830. Each of the arms 832 has a proximal end 834 attached to the base 830 and a distal end 836 spaced from the base 830. Each of the arms 832 includes a pair of prongs 838 with a corresponding recessed region 840 between the prongs 838 adjacent their distal end 836. The recessed regions 840 are sized to receive the top surface 812 of the spacer 802 between the prongs 838 such that the spacer 802 simultaneously contacts both arms 832, as shown in FIG. 2. As seen in FIGS. 18 and 19, a passage 842 is defined between the arms 832.

FIG. 2 is a section of the assembled activation mechanism 100. The assembled activation mechanism 100 includes the biasing mechanism 500 connected to the second end cap 110 of the housing 102 via any suitable connection (e.g., a weld, bolts, or a snap fit engagement) to provide a hermetic seal between the second end cap 110 and the housing 102. Additionally, the second end 510 of the casing 502 is suitably connected (e.g., via welding) to the second end cap 110 within the inner groove 722. The second barrier 504 is suitably connected (e.g., via a bonding agent such as an adhesive or a weld) to the first end 506 of the casing 502 such that the driver 508 is sealed within the casing in a hermetic manner. As a result, the second barrier 504, along with the first barrier 136 and the gasket 310, facilitate preventing adverse environmental effects (e.g., humidity) from degrading components of the activation mechanism 100, while the plug gasket 828 facilitates containing odor associated with activation of the reserve battery cell 1.

With reference to the driver 508, the trigger 800 is inserted into the trigger sleeve 700, and the trigger sleeve 700 is inserted into the ram 600 such that the inner surface 608 of the ram body 602 is positioned adjacent to the sidewall 702 of the trigger sleeve 700. The first spring 900 is disposed about the ram body 602 and is compressed between the impact disk 612 and the second end cap 110. The second spring 804 is suitably disposed between the closed end 704 of the trigger sleeve 700 and the base surface 810 of the spacer 802. The balls 808 are inserted into the ram apertures 610 through the corresponding trigger sleeve apertures 712 to hold the ram 600 in a spring-loaded position (i.e., to maintain the first spring 900 compressed between the impact disk 612 and the second end cap 110). As such, the impact disk 612 is spaced apart from the second barrier 504 within the sealed casing 502.

The balls 808 are seated against the sloped portions 818 of the spacer 802, and the ram apertures 610 are aligned with the trigger sleeve apertures 712 such that the ram apertures 610 push the balls 808 inwardly against the spacer 802 since the ram 600 is spring-biased by the first spring 900. Thus, the downward force of the ram 600 on the balls 808 pushes the balls 808 against the spacer 802 to maintain the spacer 802 between the balls 808, holding the first spring 900 in the compressed state. With the spacer 802 held between the balls 808, the plug 806 is slideably disposed above the spacer 802 within the cavity 708, and the plug gasket 828 is inserted into the peripheral groove 826.

The piston 300 is disposed within the housing 102 such that the outer surface 326 of the piston 300 (i.e., of the piston body 302 and the piston head 304) is slideable against the housing 102. The casing 502 is inserted into the interior chamber 314 of the piston 300 such that the casing 502 is spaced apart from the inner surface 312 of the piston body 302 and such that the first end 506 of the casing 502 and/or the second barrier 504 are adjacent to, or contacting, the first shoulder 320 of the piston 300. Additionally, the gasket 310 is disposed within the annular groove 308 to facilitate preventing a flow of electrolytic solution between the piston 300 and the housing 102.

The injector 400 is inserted through the bore 318 of the piston 300 such that the plate 416 of the base 402 is adjacent to the second barrier 504 with the open proximal end 408 of the needle 404 connected to the second tier 422, in abutment with the first tier 420, and extending through the bore 318 of the piston 300 and into a chamber 902 holding electrolytic solution. The open distal end 410 of the needle 404 extends through the bore 116 of the first end cap 106 and into the pocket 140 defined between the first barrier 136 and the first end cap 106. As such, the needle 404 extends through the chamber 902 containing the electrolytic solution.

FIGS. 20 and 21 are sections of the activation mechanism 100 illustrating discharge of the electrolytic solution from the housing 102 into contact with the electrodes 5 of the reserve battery cell 1. The activation mechanism 100 is configured to be connected to the electrode chamber 11 in any suitable manner (e.g., via the fitting 128 and/or the mandrel 13) such that the electrolytic solution within the chamber 902 is isolated from the electrodes 5 in the neighboring electrode chamber 11 via the first barrier 136 and can be discharged from the chamber 902 into the neighboring electrode chamber 11 through an opening caused by puncturing the first barrier 136. Upon discharge of the electrolytic solution from the chamber 902 into the neighboring electrode chamber 11, a power-generating chemical reaction occurs between the electrolytic solution and the electrodes 5 to provide a desired power output to a load.

To discharge the electrolytic solution from the chamber 902, an external force F is applied to the plug head 820 (e.g., by a user pushing on the plug 806) to push the plug 806 into the cavity 708 of the trigger sleeve 700 such that the plug 806 overcomes the bias of the second spring 804 and dislodges the spacer 802 from between the balls 808. Because the passage 842 of the plug 806 is larger than the diameter of the balls 808, the arms 832 can engage the top surface 812 of the spacer 802 within the recessed regions 840 without touching the balls 808. After the plug 806 dislodges the spacer 802 from being captured by the balls 808 (FIG. 20), the force of the compressed first spring 900 against the impact disk 612 (i.e., the downward force of the ram apertures 610 against the balls 808) pushes the balls 808 into the cavity 708 of the trigger sleeve 700, thereby releasing the spring-loaded ram 600 and allowing the first spring 900 to decompress and displace the ram 600 toward the piston 300. After the spring-loaded ram 600 is released and the external force F is no longer applied, the second spring 804 biases the spacer 802 upward in the cavity 708 such that the spacer 802 is again positioned between the balls 808 (FIG. 21).

As the first spring 900 decompresses, the contact surface 618 of the ram 600 punctures the second barrier 504 via the tooth-like serrations 622 and impacts the plate 416 of the injector 400 to drive the stem 418 of the base 402 though the bore 318 of the piston 300 until the plate 416 contacts the second shoulder 322 of the piston body 302 (FIG. 21). Once the plate 416 contacts the second shoulder 322 of the piston body 302, the ram 600 continues to decompress and pushes the piston head 304 into the chamber 902 to pressurize the electrolytic solution within the chamber 902. Additionally, the open distal end 410 of the needle 404 punctures the first barrier 136 such that the needle 404 is driven through the bore 116 of the first end cap 106 and into the case 3 (e.g., into the mandrel 13) as the first spring 900 decompresses.

With the first barrier 136 punctured, the first spring 900 is allowed to further decompress and the needle 404 is driven further through the bore 116. The pressurized electrolytic solution is discharged from the chamber 902 through the bore 116. More specifically, the needle 404 facilitates the discharge of the pressurized electrolytic solution from the chamber 902 because the pressurized electrolytic solution enters the needle body 406 through the cutouts 412 and exits through the open distal end 410. As a result, the pressurized electrolytic solution is injected into the neighboring electrode chamber 11. The gasket 310 prevents the flow of the pressurized electrolytic solution between the piston 300 and the housing 102, thereby protecting the driver 508 from being eroded by the electrolytic solution, given that the second barrier 504 is punctured and no longer covers the first end 506 of the casing 502.

Because the trigger 800 of the activation mechanism 100 has potential energy (e.g., the compression of the first spring 900), the amount of external energy that needs to be provided to the activation mechanism 100 to operate the activation mechanism 100 can be minimized. As such, the activation mechanism 100 can be used in a wider variety of applications and environments than conventional reserve batteries (i.e., activation mechanism 100 can be utilized in applications and/or environments in which only external forces of lesser magnitudes may be readily available). For example, in one suitable embodiment, the activation mechanism 100 is operational in response to an external force in the range of about 5-10 pounds.

It is contemplated that various aspects of the activation mechanism 100 can be modified to either increase or decrease the amount of external energy needed to operate the activation mechanism 100 (e.g., the contours of the sloped portions 818 can be adjusted to have more or less slope, and the spring constant of either the first spring 900 or the second spring 804 can be adjusted to facilitate either increasing or decreasing the minimum external force application needed to operate the trigger 800), thereby enabling the activation mechanism 100 to be customized to be operated with a desired external force while minimizing the risk of accidental activation due to mishandling, external shock, or vibration from shipping.

When introducing elements of the present invention or the preferred embodiment(s) thereof, the articles "a", "an", "the", and "said" are intended to mean that there are one or more of the elements. The terms "comprising," "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A biasing mechanism for pressurizing an electrolytic solution contained in a chamber of a reserve battery cell, the biasing mechanism comprising:
   a compressed spring;
   a casing having an opening;
   a barrier covering the opening in the casing;
   a trigger operatively associated with the compressed spring, wherein the trigger is configured to release the compressed spring to pressurize the electrolytic solution;
   a ram that is spring-loaded within the casing via the compressed spring, wherein
      the ram is configured to be displaced to puncture the barrier upon release of the compressed spring,
      the ram further comprises a pair of apertures,
      the trigger comprises a pair of balls inserted into the apertures of the ram to keep the ram spring-loaded, the trigger being configured such that the balls can be pushed from the apertures by the ram to release the compressed spring; and
   a trigger sleeve comprising a body that defines a cavity and a pair of apertures, wherein
      the trigger further comprises a spacer biased within the cavity via a second spring such that the spacer is held between the balls to keep the balls inserted into the apertures of the ram through the apertures of the trigger sleeve, and
      the spacer is configured to be dislodged from between the balls to overcome the bias of the second spring in response to an external force such that the balls are pushed into the cavity by the ram.

2. The biasing mechanism according to claim 1, wherein the ram comprises a plurality of serrations configured to puncture the barrier upon displacement of the ram.

3. The biasing mechanism according to claim 1, wherein the trigger further comprises a plug that can dislodge the spacer from between the balls in response to the external force being applied to the plug.

4. The biasing mechanism according to claim 3, wherein the trigger further comprises a gasket disposed about the plug to prevent a flow of fluid out of the cavity between the plug and the trigger sleeve.

5. The biasing mechanism according to claim 3, wherein the plug comprises a pair of arms that are spaced apart from one another and are configured to engage the spacer.

6. A method of assembling a biasing mechanism for releasing an electrolytic solution contained in a chamber within a reserve battery cell, the method comprising:
- compressing a spring;
- providing a casing having an opening;
- providing a barrier covering the opening in the casing;
- operatively associating a trigger with the compressed spring, the trigger configured to release the compressed spring such that the compressed spring decompresses to pressurize the electrolytic solution;
- operatively associating a ram within the casing with the compressed spring, wherein the ram is configured to be displaced to puncture the barrier upon release of the compressed spring, wherein the ram comprises a pair of apertures;
- inserting a pair of balls into the apertures of the ram to keep the ram spring-loaded, the trigger being configured such that the balls can be pushed from the apertures by the ram to release the compressed spring; and
- providing a trigger sleeve comprising a body that defines a cavity and a pair of apertures, wherein the trigger further comprises a spacer biased within the cavity via a second spring such that the spacer is held between the balls to keep the balls inserted into the apertures of the ram through the apertures of the trigger sleeve; and the spacer is configured to be dislodged from between the balls to overcome the bias of the second spring in response to an external force such that the balls are pushed into the cavity by the ram.

* * * * *